United States Patent [19]

Eigenmann

[11] Patent Number: 4,461,862
[45] Date of Patent: Jul. 24, 1984

[54] SELF EXTINGUISHING POLYMERIC COMPOSITIONS, WHICH UPON CONTACTING A FLAME PROVIDE A NONDROPPING CHAR-FORMING INCANDESCENT CRUST, AND WHICH DO NOT PRODUCE FLAME NEITHER TOXIC FUMES

[76] Inventor: Ludwig Eigenmann, P.O. Box 8, CH 6833 Vacallo, Switzerland

[21] Appl. No.: 267,571

[22] Filed: May 27, 1981

[30] Foreign Application Priority Data

Jun. 2, 1980 [CH] Switzerland .......................... 4250/80
Jan. 14, 1981 [CH] Switzerland ............................ 200/81

[51] Int. Cl.$^3$ .............................................. C08K 5/52
[52] U.S. Cl. ..................................... 524/101; 524/414; 524/416; 525/158; 525/186; 525/509; 528/244; 528/254
[58] Field of Search ............. 106/18.15; 260/45.8 NE, 260/45.9 NP; 428/921; 524/100, 101, 136, 147; 523/179; 525/158, 186; 528/367, 398, 400

[56] References Cited

U.S. PATENT DOCUMENTS

| | | | |
|---|---|---|---|
| 2,582,961 | 1/1952 | Burnell et al. ...................... | 428/921 |
| 3,663,502 | 5/1972 | Murray et al. .............. | 260/45.9 NP |
| 3,810,862 | 5/1974 | Mathis et al. ................ | 260/45.9 NP |
| 3,839,276 | 10/1974 | Rohlfs et al. ................ | 260/45.9 NP |
| 3,885,912 | 5/1975 | Golborn et al. .................... | 428/393 |
| 3,936,416 | 2/1976 | Brady ........................... | 260/45.9 NP |
| 3,969,291 | 7/1976 | Fukuba et al. ...................... | 523/179 |
| 4,043,987 | 8/1977 | Jolicoeur et al. ........... | 260/45.8 NE |
| 4,085,283 | 4/1978 | Den Otter et al. .......... | 260/45.8 NT |
| 4,195,139 | 3/1980 | Goulding et al. ................... | 525/158 |
| 4,198,493 | 4/1980 | Marciandi ......................... | 525/164 |
| 4,216,138 | 8/1980 | Bost et al. ........................... | 524/100 |
| 4,265,806 | 5/1981 | Grundmann et al. ....... | 260/45.8 NT |

Primary Examiner—John Kight, III
Assistant Examiner—R. A. White
Attorney, Agent, or Firm—Michael J. Striker

[57] ABSTRACT

There are described certain polymeric compositions which are made flame retarding, provide an incandescent char-forming crust, are not dropping and do not promote toxic fumes, in view of the addition, on 100 parts in weight of polymer, of 5–40 parts in weight of the reaction product between an acid of the phosphorus and at least a hydroxyalchyl derivative of at least a compound selected between the isocyanuric acid, the melamine and the urea, and, in a modified embodiment, in addition to the above indicated reaction product, of 5–30 parts in weight of a polymer of an ammonium polyphosphate of formula $(NH_4PO_3)_{n''}$, wherein $n''$ is greater than 20. In a further modified embodiment there is added amine phosphate, such as the ortho- or pyrophosphate of melamine, in amount of 1–10 parts in weight. The reaction product as above comprises in its molecule the formula $$N-(R)_{n'}-O-P$$

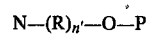

Where R is at least a linear or branched alkylene derivative, $n'$ is comprised between 1 and 6, and P is tri- or pentavalent.

11 Claims, No Drawings

SELF EXTINGUISHING POLYMERIC COMPOSITIONS, WHICH UPON CONTACTING A FLAME PROVIDE A NONDROPPING CHAR-FORMING INCANDESCENT CRUST, AND WHICH DO NOT PRODUCE FLAME NEITHER TOXIC FUMES

BACKGROUND OF THE INVENTION

The present invention concerns self extinguishing polymeric compositions which, upon contacting flame, provide an intumescent char-forming crust, do not produce flame neither toxic fumes, more particularly it concerns the preparation of a synthetic organic compound which contains phosphorus and nitrogen and which, added to synthetic polymers such as polypropylene, or mixtures of such polymer with elastomers and/or with conventional fillers and additives, yield polymeric compositions which when contacting a flame, provide a charforming intumescent crust, and nondropping neither flame nor toxic fumes promoting.

Several processes for making fireproofing or uninflammable polymers are known in the art; such processes are generally based upon the use of metallic compounds, particularly antimony ones, in combination with thermally unstable halogenated compounds, such for example chlorinated paraffin waxes and/or bromided organic compounds.

The art has proposed, to act as flame-retardant and flame barrier several phosphorus containing compounds, for example as disclosed in the U.S. Pat. No. 4,010,137, the diclosure of which is herein referred to.

The combinations "metallic compound+halogenated compound" yields satisfying results as far as the flame-retardant properties conferred thereby to the polymers, but they are subject to serious drawbacks: corrosive phenomena in the mechanism in which the treatment of the materials is performed, and intense outlet of toxic fumes and gases when a fire occurs. Further, acceptable flame retardancy levels are obtained by making use of high concentration of such combinations only.

SUMMARY OF THE INVENTION

It has been now surprisingly found that it is possible to make flame-retardant thermoplastic polymers of the type referred above, by the addition of a particular organic compound which does not promote the also above indicated drawbacks.

The present invention concerns flame-retardant polymeric compounds which upon contacting the flame, provide an incandescent char-forming crust, which are nondropping and promote neither flame nor toxic fumes, such polymeric compounds being characterized: by comprising, in 100 parts in weight of a thermoplastic polymer, from 5 to 40 parts in weight of a reaction product having a chemical structure of the type

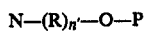

$$N-(R)_{n'}-O-P$$

in which R is an alkylene derivative, n' is comprised between 1 and 6, the said reaction product including more than one nitrogen atoms interbonded through one or more carbon atoms; to said reaction product it may be associated from 5 to 30 parts in weight of a polymer consisting of an ammonium polyphosphate.

The ammonium polyphosphate polymer advantageously consists of an ammonium polyphosphate having a chemical structure of the type $(NH_4PO_3)_{n''}$, wherein $n''$ is greater than 20.

In the following of the present disclosure, the above defined reaction product is indicated as component A, while the ammonium polyphosphate polymer is indicated component B.

The present invention concerns also a process for producing the reaction product of which the component (A) consists, the process being characterized by the fact that said reaction product is preliminarily obtained by causing an acid of phosphorus to react with an hydroxyalkyl derivative.

The acid of phosphorus acid can consist of the phosphorous of formula $H_3PO_3$, or a phosphoric acid, the properties and composition vary according to its $H_3PO_4$ content, which can vary between 50 and 120% in weight, preferably from 80 and 115%.

According to a particular embodiment of the invention, the polymeric composition is characterized by the fact that, in the component (A) the alkylene derivative is a hydroxyalkyl derivative of an isocyanuric acid and, of a melamine or.

In some preferred even if not limitative embodiments of the invention:

(a) the isocyanuric acid hydroxyalkyl derivative is preferably the tris(2hydroxyethyl) isocyanurate having a nitrogen content from 15 to 17% in weight, and a melting point from 132° C. and 138° C.;

(b) the hydroxyalkyl derivative of the melamine is a methylol derivative, such the trimethylol- or the hexamethylolmelamine.

The reaction product between the acid of phosphorus and the several hydroxyalkyl derivatives of the isocyanuric acid and/or of the melamine is preferably promoted by entering the reagents into a reactor provided with a stirrer, of the two-walled type heated by circulating warm oil, and provided with a degasing vacuum system. The temperature varies from 140° C. to 260° C. during the entire reaction time, which at its turn varies between 2 and 7 hours.

The molar ratio between the acid of the phosphorus and the of the several hydroxyalkyl derivatives of the isocyanuric acid and/or of the melamine is comprised between 4:1 and 0.1:4.

There is also possible using synthesis methods such as the esterification of the hydroxyalkyl derivatives which phosphorus halides or by means of transesterification reactions between phosphoric esters and hydroxyalkyl derivatives.

The reaction products of which the component (A) is consisting, and the ammonium polyphosphate polymer of which the component (B) is consisting, can be added to any type of thermoplastic polymer, principally polymers and copolymers (either statistical and block polymers) for example of olefines, and said mixtures of said polymers with elastomers; the same can be also made use of in the production of varnishes, coatings and fibers.

The respective flame retardant compositions are prepared by making use of known techniques, that is by mixing the polymer to be made flame retardant, the reaction products of type (A) and also, in the embodiment II, the ammonium polyphosphate into a Banbury type mixer, or two-screw extruder, operating at the plasticization temperature of the polymer. The thus obtained batch is then pressed at the most suitable temperature for providing the desired man-made articles.

The flame retarding properties of the polymeric composition herein concerned with are determined by pressing the granular product into sheets having a thickness of 3 mm by means of a small press and operating for 7 minutes at a pressure of 40 Kg/cm² at a suitable temperature which can be varied from polymer to polymer. On the such prepared sheets the flame retarding level is measured either by measuring the "oxygen index", which indicates the minimal percentage of $O_2$ in a mixture $O_2/N_2$, which is necessary in the sample for continuative burning, or also by making use of the UL-94 ("Underwriters Laboratories"-U.S.A.) specifications, which provide an evaluation of the flame retarding property rating of the plastic materials, and take into account more or less severe testing conditions, which admit to classify the sample at different flame retarding levels.

The novel features which are considered as characteristic for the invention are set forth in particular in the appended claims. The invention itself, however, but as to its construction and its method of operation, together with additional objects and advantages thereof, will be best understood from a following description of specific embodiments.

DESCRIPTION OF THE PREFERRED EMBODIMENTS

In the tests hereinbelow indicated in Table I there has been made use of the "Vertical Burning Test", which permits to classify the material at decreasing levels V-0, V-1 and V-2.

Each test is made on a group of 5 samples having a thickness of ⅛ inch, which are sustained in vertical position, and which are primed by flame at their lower end, and two ignition attempts are made, each attempt being of 10 seconds.

The three flame retarding levels V-0, V-1 and V-2 are defined as follows:

V-0 = no sample burns for more than 10 seconds, at each flame application, neither promotes ignited particles dropping.

Additionally, the combustion total time is not longer than 50 seconds for any attempt provided on the group of 5 samples.

V-1 = combustion times up to 30 seconds are admitted for each individual test and up to 250 seconds for 10 attempts made on the group of 5 samples.

At this level also no sample promotes ignited particles dripping.

V-2 = the admitted combustion times are those of level V-1, but the dropping of ignited particles is admitted.

The following not limiting Examples illustrate the several aspects of the invention.

The Examples from 1 and 2 relate to the use of component B associated to component A.

EXAMPLE 1

50 gr. of phosphoric acid ($H_3PO_4 = 85\%$) are caused to react with 250 gr. of tris(2 hydroxyethyl) isocyanurate, into a 2.500 cc. reactor, under stirring at a temperature of 150° C., for 1.5 hours. After this time period a vacuum of 300 mm Hg is applied and the temperature is raised up to 250° C. for a time period of 4 hours.

During this latter time period the reaction $H_2O$ is removed and in the compound there is promoted a substantial reticulation between the various molecules of the phosphoric ester, which has been formed in the first stage of the reaction.

The product is discharged from the cooled reactor and ground into a powder the granules of which are of diameter less than 80 microns.

The powders which are obtained from Example 1 are mixed with the thermoplastic polymers and, with ammonium polyphosphate, in a Bambury type mixer at the temperature which is most suitable for obtaining a granular product, said temperature varying from one polymer to other polymer.

The results are indicated as examples in the following Table 1, in which as polymer polypropylene is used.

TABLE 1

|  | parts in weight | |
| --- | --- | --- |
| Component A Example 1 | 15 | |
| Polyphosphate NH₄ | 15 | |
| Polypropylene (MI = 10) | 70 | 65 |
| Oxygen index | 33,5 | 29,5 |
| UL 94 (1/9") test | V—O | V—O |

It will be understood that each of the elements described above, or two or more together, may also find a useful application in other types of polymeric compositions differing from the types described above.

While the invention has been illustrated and described as embodied in self-extinguishing polymeric compositions, which upon contacting a flame provide a nondropping char-forming incandescent crust, and which do not produce flame neither toxic fumes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by patent is set forth in the appended claims:

1. Flame retardant polymeric compositions which upon contacting a flame, provide an intumescent charforming crust, which are non-dripping and promote neither flame nor toxic fumes, comprising in 100 parts by weight of a thermoplastic polymer, from 5 to 40 parts by weight of a reaction product between an acid of phosphorus and hydroxyalkyl derivative of isocyanuric acid, said reaction product including a chemical group of the type

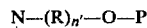

N—(R)$_{n'}$—O—P in which R is an alkylene derivative, and n' is between 1 and 6, said reaction product including a plurality of nitrogen atoms interbonded through one or more carbon atoms.

2. Flame retardant polymeric compositions which upon contacting a flame, are nondripping and promote neither flame nor toxic fumes, comprising, in 100 parts by weight of a thermoplastic polymer:

(A) from 5 to 40 parts by weight of a reaction product between an acid of phosphorus and a hydroxyalkyl derivative of isocyanuric acid, said reaction product including a chemical group of the type $$N-(R)_{n'}-O-P$$

in which R is an alkylenderivative, and n' is between 1 and 6 said reaction product including a plurality of nitrogen atoms interbonded through one or more carbon atoms: and (B) from 5 to 30 parts by weight of an ammonium polyphosphate.

3. Polymeric compositions according to claim 2, wherein the ammonium polyphosphate has a chemical structure of the type $(NH_4PO_3)_{n''}$ wherein n'' is greater than 20.

4. Polymeric compositions according to claim 1, wherein in the reaction product, the nitrogen atoms and the carbon atoms are interbonded in an heterocyclic structure.

5. Polymeric composition according to claim 1 wherein the hydroxyalkyl derivative of isocyanuric acid is tris(2 hydroxyethyl) isocyanurate.

6. Polymeric compositions according to claim 1, wherein the hydroxyalkyl derivative of isocyanuric acid has the formula

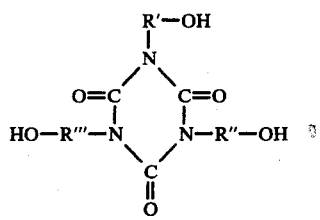

wherein R', R'' and R''' are the same or different and are linear or branched alkylenic radicals containing from 1 to 6 carbon atoms.

7. Polymeric compositions according to claim 1, and in association with a polymer of $P_2O_5$.

8. Polymeric compositions according to claim 1, wherein the acid of phosphorus is selected from the group consisting of $H_3PO_3$ and $H_3PO_4$.

9. Polymeric compositions according to claim 1, wherein the molar ratio between the acid of phosphorus and the hydroxyalkyl derivative of isocyanuric acid is between 4:1 and 0.1:4.

10. Flame retardant polymeric compositions which upon contacting a flame, provide an instumescent char-forming crust, which are non-dripping and promote neither flame nor toxic fumes, comprising in 100 parts by weight of a thermoplastic polymer, from 4 to 40 parts by weight of a reaction product between an acid of phosphorus and a hydroxyalkyl derivative of isocyanuric acid, said reaction product including a chemical group of the type $$N-(R)_{n'}-O-P$$

in which R is an alkylene derivative, and n' is between 1 and 6, said reaction product including a plurality of nitrogen atoms interbonded through one or more carbon atoms, wherein P is trivalent phosphorus.

11. Process for producing flame retardant polymeric compositions which upon contacting a flame, provide an intumescent char-forming crust, which is non-dripping and promote neither flame nor toxic fumes, the process comprising the step of reacting an acid of phosphorus with a hydroxyalkyl derivative of isocyanuric acid to provide a reaction product, and adding from 5 to 40 parts by weight of the reaction product to 100 parts by weight of a thermoplastic polymer, said reaction product including a chemical group of the type $$N-(R)_{n'}-O-P$$

in which R is an alkylene derivative and n' is between 1 and 6, and wherein said reaction product includes a plurality of nitrogen atoms interbonded through one or more carbon atoms.

* * * * *